United States Patent [19]

Sprenger

[11] 4,280,878
[45] Jul. 28, 1981

[54] STRUCTURE AND PROCESS FOR RECLAIMING HEAT FROM CHARCOAL PRODUCTION FACILITY

[76] Inventor: Gerald E. Sprenger, 200 Hazelwood Ave., Dothan, Ala. 36301

[21] Appl. No.: 89,591

[22] Filed: Oct. 30, 1979

[51] Int. Cl.³ .................. C10B 1/00; C10B 53/02; F23D 13/20; F26B 7/00
[52] U.S. Cl. .................................. 202/93; 34/13.8; 34/47; 201/27; 422/182; 431/5
[58] Field of Search ............... 201/27, 41; 202/93; 34/47, 13.8; 422/183, 182; 431/5

[56] References Cited

U.S. PATENT DOCUMENTS

| | | | |
|---|---|---|---|
| 284,058 | 8/1883 | Pierce | 201/27 |
| 2,743,529 | 5/1956 | Hayes | 34/47 X |
| 3,090,731 | 5/1963 | Keil | 201/27 |
| 3,192,905 | 7/1965 | Barnes | 422/183 X |
| 3,567,399 | 3/1971 | Altmann et al. | 422/183 |
| 3,761,568 | 9/1973 | Brink et al. | 201/27 X |
| 3,763,012 | 10/1973 | Kelley | 202/93 |
| 3,945,331 | 3/1976 | Drake et al. | 34/47 X |
| 4,101,632 | 7/1978 | Lamberti et al. | 431/5 X |

*Primary Examiner*—Frank W. Lutter
*Assistant Examiner*—Roger F. Phillips
*Attorney, Agent, or Firm*—Harvey B. Jacobson

[57] ABSTRACT

The wood gases of a facility for the carbonization of wood to produce a lump charcoal are passed to an afterburner. The afterburner utilizes auxiliary burner units set at an angle to the combustion chamber centerline to provide heat for increasing the temperature of the refractory liner to the combustion level. Combustion air is introduced into the chamber resulting in a rapid mixing of the air with the gas. As a result of the introduction of the combustion air, a cyclonic movement of the flame occurs resulting in continuous contact between the gas and the hot refractory during its passage through the combustion chamber. The burned wood gases are maintained at a predetermined temperature by mixture with ambient air and supplied directly for an end use comprising lumber drying kilns. The burned wood gases are thus capable of economically drying southern pine lumber to 20% moisture content in one-fifth the time required by natural air drying.

10 Claims, 6 Drawing Figures

STRUCTURE AND PROCESS FOR RECLAIMING HEAT FROM CHARCOAL PRODUCTION FACILITY

BACKGROUND OF THE INVENTION

1. Field of the Invention

This invention relates generally to heat recovery systems and particularly to such systems which recapture and reburn the wood gases from a wood carbonizing facility for direct application to an end use facility such as wood drying kilns.

2. Discussion of Related Art

Historically, conversion of low-grade hardwood and saw mill scrap to charcoal and/or heat energy has been carried out through processes that were primarily suited to produce either charcoal or heat energy with little effort to salvage or market the other. Also, these processes usually require large investments in machinery and are not economically feasible for small to medium sized saw mills. These mills normally cannot justify the investment and/or operating costs necessary to dry lumber and are therefore limited by weather conditions, financial resources or market conditions, including market size and production volume available. Accordingly, a need has arisen for disposing of waste wood products in an economical, practical and environmentally safe manner.

U.S. Pat. No. 649,757, issued May 15, 1900, to Robertson, shows a lumber drying facility wherein the exhaust steam of the engine of a lumber mill is utilized to afford heat in the drying kiln. U.S. Pat. No. 1,083,813, issued Jan. 6, 1914, to Farrell, also shows the concept of utilizing waste heat produced in a production facility for subsequent product drying. U.S. Pat. No. 1,423,136, issued July 18, 1922, to Mueller, shows yet another system wherein waste heat is recirculated to provide a drying medium for use in a kiln. Mueller's waste heat is derived from the exhaust steam from a steam driven motor used for producing a positive circulation of the drying air. U.S. Pat. No. 1,499,976, issued July 1, 1924, to Friderichsen, shows a heating system which utilizes the waste heat generated in drying kilns for the heating of buildings, drawing rooms, and the like. However, none of these patents shows a system whereby scrap wood from lumber mills is used to produce both saleable charcoal products and products of combustion which are used in drying kilns.

There also exist many suggested types of combustion chambers for use as afterburners. For instance, U.S. Pat. No. 3,192,905, issued July 6, 1965, to Barnes, shows a carbon monoxide oxidizer and fluid heater which makes use of a cylindrically shaped combustion chamber having a circular lower section with tangentially connected gas inlet ports and an intermediate venturi like restricted diameter mixing section with a circular upper combustion section. U.S. Pat. No. 3,194,215, issued July 13, 1965, to Barnes, shows a similar carbon monoxide burner apparatus having a cylindrical combustion chamber with internal refractory lined walled portions, a lower flue gas inlet section, and an upper gas combustion section having a hot gas outlet passageway in a restricted diameter gas mixing zone positioned between the inlet gas section and the upper combustion section. U.S. Pat. No. 3,423,928, issued Jan. 28, 1969, to Walsh, discloses an afterburner comprising a perforated venturi throat to draw air into the stream of exhaust in a fuel nozzle positioned downstream from the venturi throat. The nozzle is of the fuel aspirating type wherein the passage of gases therethrough draws fuel into the nozzle. Other suggested afterburners include those shown in U.S. Pat. No. 3,754,869, issued Aug. 28, 1973, to Van Raden, and U.S. Pat. No. 3,930,802, issued Jan. 6, 1976, to Beasley et al.

SUMMARY OF THE INVENTION

One object of the present invention is to provide an apparatus for the production of lump charcoal from waste wood, which apparatus is capable of reclaiming the products of combustion of the waste wood and mixing these with tempering air dilution directly for an end use without the need of a heat exchanger between the heat source and the end use.

Another object of the present invention is to provide an apparatus for reclaiming the heat from a charcoal production facility, which apparatus utilizes a tempering air damper to control the temperature of the products of combustion at varying volume use rates.

Yet another object of the present invention is to provide an apparatus for reclaiming heat from a charcoal production facility, which apparatus uses an afterburner having auxiliary burner units set at an angle to the combustion chamber centerline for increasing the temperature of the refractory liner to a combustion level when supplied with fuel and to provide lance like introduction of combustion air which causes rapid mixing of the air and the gas and imparts a cyclonic movement to flame resulting in continuous contact with the hot refractory lining during its passage through the combustion chamber when the auxiliary fuel supply is shut off.

A further object of the present invention is to provide an apparatus for reclaiming heat from a charcoal production facility, which apparatus is capable of automatically bypassing products of combustion not utilized for heating purposes.

Still another object of the present invention is to provide an apparatus for reclaiming heat from a charcoal production facility, which apparatus can continuously monitor hot gas for combustibles so that an operator can adjust controls to assure complete combustion.

Even another object of the present invention is to provide an apparatus for reclaiming heat from a charcoal production facility which apparatus can be used on the site of a saw mill to provide efficient, economical, safe conversion of waste wood to charcoal and efficient, economically feasible and environmentally safe drying of saleable wood.

In accordance with the above objects, the present invention includes a Missouri-type kiln or a plurality of such kilns for the production of charcoal. Outlets from the kilns are channeled to a kiln smoke afterburner through a manifold pipe connected to a smoke receiver plenum on the afterburner positioned below the combustion chamber. The afterburner combustion chamber is cylindrically shaped and contains a plurality of adjustable air inlets circumferentially disposed thereabout. The burners will be automatically modulated to maintain 538° C. A stack rises vertically above the combustion chamber with a T-section installed in the afterburner stack immediately above the afterburner itself. The T-section is connected to the inlet flange of a hot air transfer fan. The air through the fan and connecting duct work is channeled to a lumber drying building and is controlled to 100° C. by means of a temperature indicating controller which modulates a damper positioned in the T-connector.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
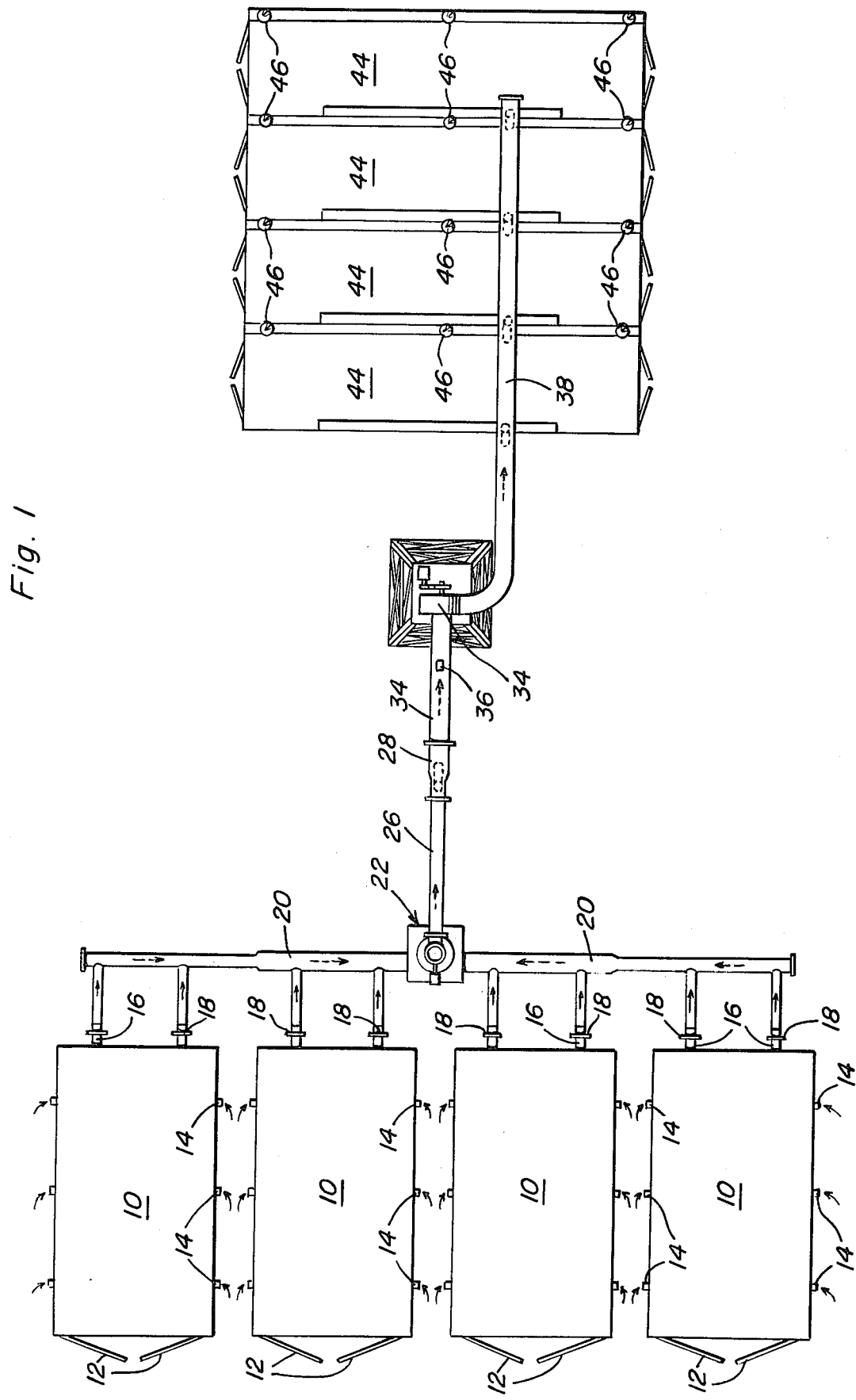
FIG. 1 is a top plan view of the structure for reclaiming heat from a charcoal production facility.
Figure 2:
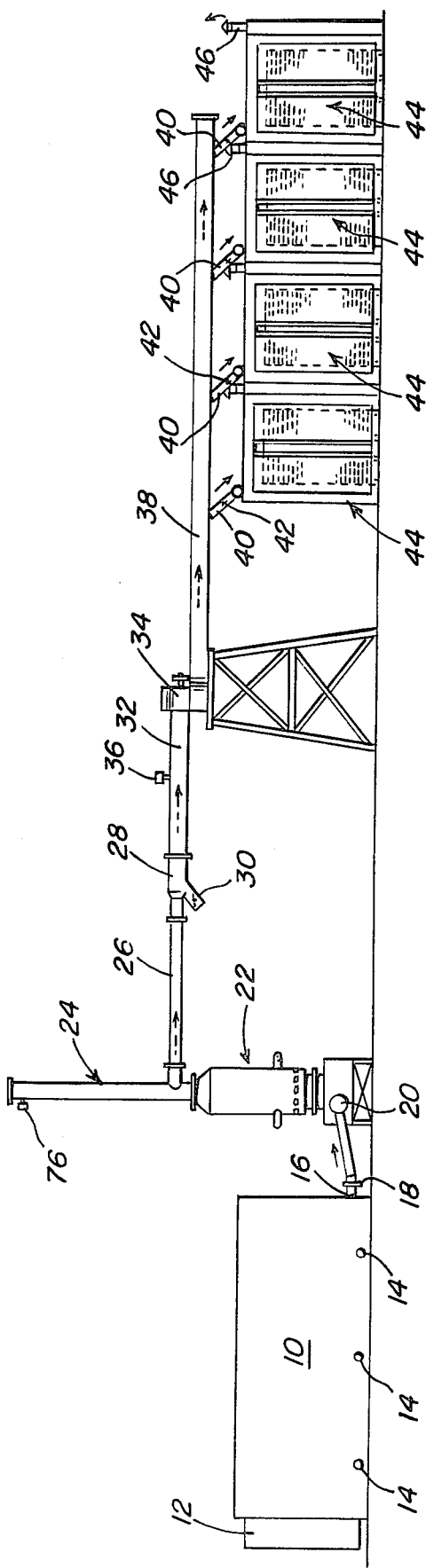
FIG. 2 is a side elevational view of the structure for reclaiming heat from a charcoal production facility.
Figure 3:
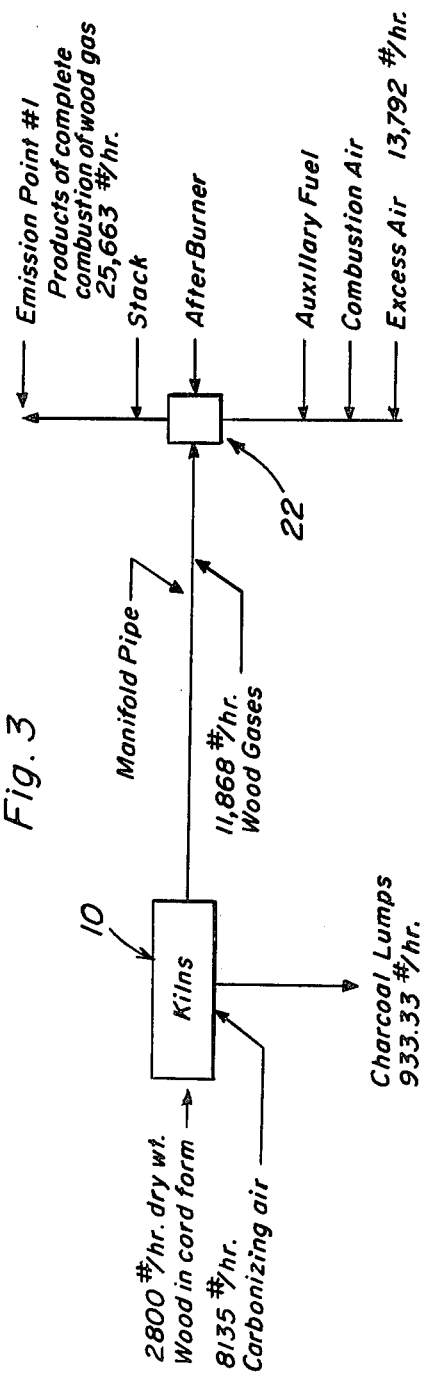
FIG. 3 is a schematic representation showing the process for reclaiming heat from a charcoal production facility.

Now with reference to the drawings, a structure and process for reclaiming heat from a charcoal production facility incorporating the principles and concepts of the present invention will be described in detail. With particular reference to FIGS. 1 through 3, it will be seen that four Missouri-type 100 ton charcoal kilns 10 are used to transform waste wood into charcoal lumps. Each kiln 10 includes a pair of front doors 12 through which the waste wood is delivered in cord form for processing into charcoal. A plurality of air inlets 14 are spaced along each sidewall of each kiln to provide carbonizing air to the kiln interior. The back wall of each kiln is supplied with a pair of 16" diameter openings which are disposed 5' from each side wall and 6" above the floor. Each opening 16 is connected to an outlet conduit having a slide gate 18 positioned therein. The outlet conduits are connected to a pair of manifolds 20 which direct the wood gases from kilns 10 to afterburner 22. The four kilns 10 are capable of producing 900.33 pounds per hour of charcoal lumps and 11,868 pounds per hour of wood gases from 2800 pounds per hour dry weight wood in cord form and 8135 pounds carbonizing air. The 11,868 pounds per hour of wood gases are equivalent to approximately 3.6 million BTU's per hour of heat energy.

The wood gases which are delivered to the afterburner 22 are caused to ignite therein by maintaining the afterburner at a temperature of 538° C. The afterburner 22, which will be described in more detail hereinafter, receives approximately 3.07 pounds per hour of auxiliary fuel to maintain the incendiary temperature and takes approximately 13,792 pounds per hour of excess air giving off 25,663 pounds per hour of products of complete combustion of the wood gases received through the manifold pipe 20. The products of complete combustion from the afterburner 22 are emitted on a controlled basis through either afterburner stack 24 or a 24' length of stainless steel pipe 26 which is 24" in diameter and extends horizontally from the stack 24 and connects to a 24"×24"×30" tempering air damper tee 28 which allows admixing of the products of complete combustion with fresh air admitted on a controlled basis by means of damper 30. The tee 28 is connected to a 12' long section of 30" diameter pipe 32 produced from mild steel. Pipe 32 extends between the tee 28 and an intake flange of hot air transfer fan 34. Fan 34 is of the non-overloading type with a capacity of 20,000 CFM at 6" static pressure. The air through the fan 34 is maintained at 100° C. by means of a temperature indicating controller which receives a signal from thermocouple 36 located in pipe 32 and controls the position of damper 30. The 100° C. air is supplied through manifold 38 and outlet pipes 40 which contain dampers 42 into lumber drying kilns 44. The hot gases are circulated through the lumber drying kilns 4 and eventually exit through kiln vents 46.

Figure 4:
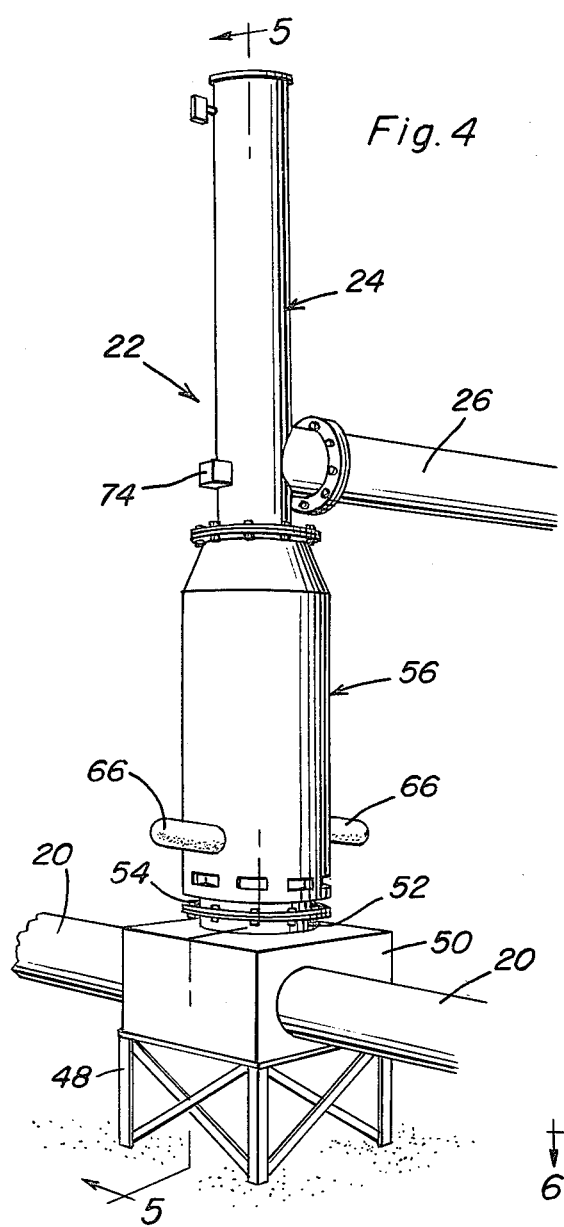
FIG. 4 is a perspective view of the afterburner of the invention.
Figure 6:
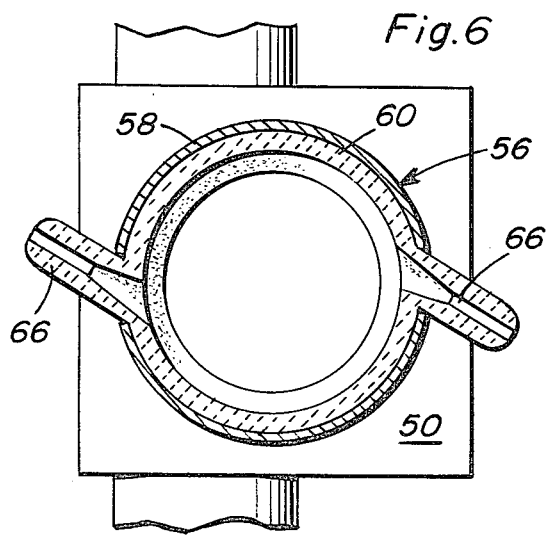
FIG. 6 is a top plan sectional view taken substantially along a plane passing through section line 6—6 of FIG. 5.
Figure 5:
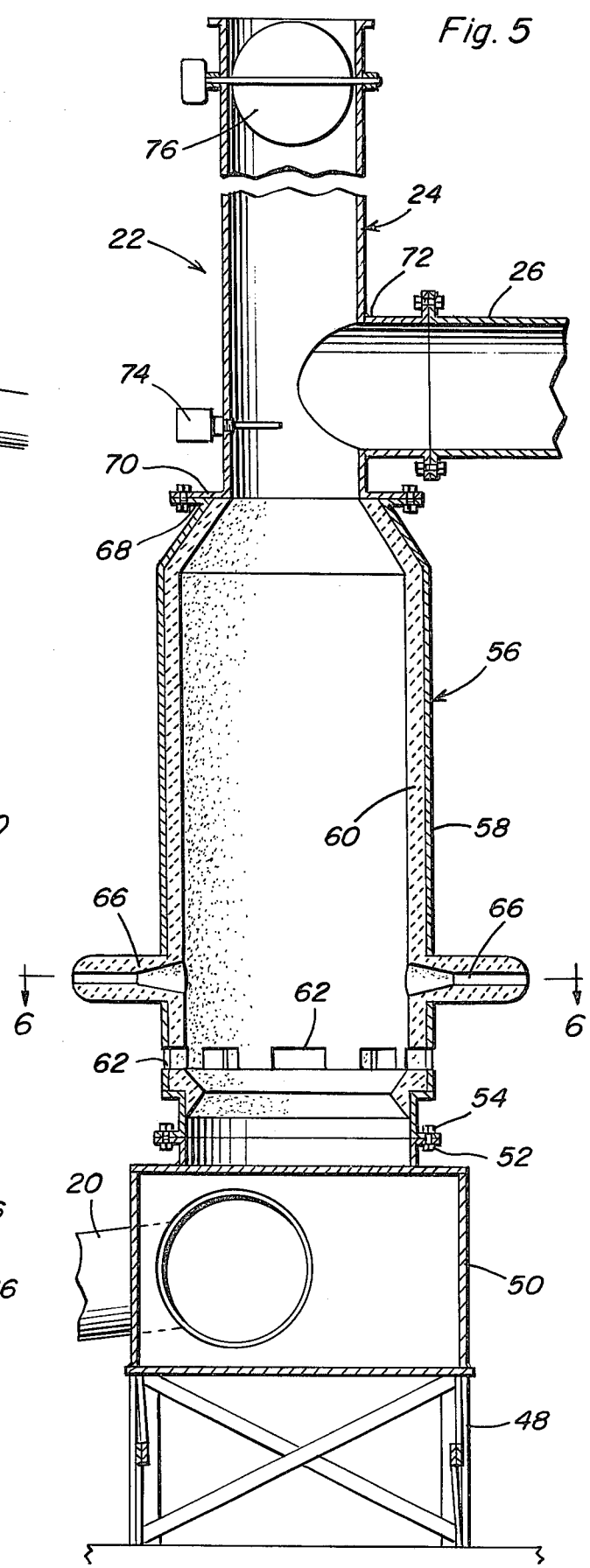
FIG. 5 is an elevational sectional view of the afterburner taken substantially along a plane passing through section line 5—5 of FIG. 4.

Now with reference to FIGS. 4 through 6, a detailed description of the afterburner 22 will be entered into. Afterburner 22 rests on a stand 48 and comprises a receiving plenum 50 which is directly connected to manifolds 20. Plenum 50 has a mounting flange 52 which is bolted to cooperating flange 54 of the afterburner combustion chamber 56. The entire combustion chamber is produced with a ¼" carbon steel shell 58 lined with a 3" thick refractory liner 60. The shell 58 is 5' in diameter and extends for a vertical height of 12' above flange 54. The combustion chamber is cylindrical in shape and contains eight 4"×9" adjustable air inlets 62 formed in the bottom thereof, just above flange 54. A pair of auxiliary fuel burners 66 are mounted to the combustion chamber 56 and serve to maintain the combustion chamber at a proper incendiary temperature. The fuel burners 66 are standardly available units manufactured by North American Manufacturing Company for full modulating fuel control to provide 210 to 630 MBTUH each. The burners 66 are mounted at radially opposed positions on the combustion chamber 56 and are set such that their center lines are disposed at an angle of 30° with respect to a diameter of the combustion chamber at the point of mounting of the burners on the shell 58.

Stack 24 is 20' in height and can be formed from 10 gauge 304 stainless steel or 10 gauge carbon steel with a 2" refractory liner. A mounting flange 68 is formed on the top of combustion chamber 56 and is bolted to a mounting flange 70 formed on the bottom of stack 24. A 24" diameter stainless tee section 72 is installed in the afterburner stack 24 immediately above mounting flange 70 and comprises the source for the entire utilization of heat energy for drying lumber. A thermocouple 74 is also installed in the stack immediately above flange 70 for monitoring the temperature within the afterburner. Thermocouple 74, through an appropriate controller, serves to modulate burner 66 so as to main the temperature within the combustion chamber 56 at 538° C. An electrically operated stainless steel butterfly damper 76 is installed in the top of stack 24 one foot down from the top. Damper 76 is actuated by the same controller used for damper 30 shown in FIGS. 1 and 2 and is set to assure that adequate heat is diverted to the transfer fan 34 to maintain the 100° C. temperature and also to automatically bypass all of the heat when the transfer fan is shut down.

In operation, waste wood in the form of 8" and smaller diameter 8' long poles or slabs is banded into units that weigh approximately 3,000 pounds. Wood stringers or cribs are located on the floor of kilns 10 and there are six rows of cribs in each kiln with each row being 8' long running lengthwise of the kiln on 3' centers and 2' off the sidewalls with three rows running crosswise of the kiln on 3' centers and 2' from the rear wall to provide space for air circulation. The banded units are placed lengthwise in the kiln on the stringers and stacked as compactly as possible to the roof while touching the rear wall. This procedure is repeated for the second tier of 8' units making sure that the tiers fit tightly together. At this time, a cubic yard of dry wood or kindling is placed on the kiln floor equal in distance from each sidewall and so fitted into the tier that the next or third tier of 8' units will fit up tightly to the second tier. The same procedure as used in tier one and tier two is repeated in loading tiers three and four. The loading of each kiln is now completed and the kiln doors are closed and sealed with mortar mud or lime paste to minimize air leakage.

The auxiliary burners are now placed in operation and the temperature in the stack indicating controller is set at approximately 540° C. The isolation gates 18 in the ducts from the kilns are opened and a slight draft is induced through the kiln by virtue of the stack effect of the afterburner 22. When the stack temperature reaches the set point, the dry wood kindling is ignited by means of an oil soaked rag tied to the end of a 20' length of ⅜" diameter pipe which is ignited and pushed under the kiln door and into the kindling. When good ignition of the kindling is established as observed through openings under the door, the length of pipe is removed and stored. The carbonizing cycle is begun when the temperature in the top center of the kiln under the roof reaches 300° C. The cycle will last approximately 100 hours with emission of mostly water vapor occuring the first 24 hours and emission of combustible gas during the remaining time. After 24 hours, the kiln should be supplying smoke rich in gas to the afterburner and the auxiliary fuel burning will be at a minimum. At this time, the heat transfer fan will be started with the tempering air damper 30 in the open position. The temperature indicating controller for process heat will be set at 100° C. and the tempering air damper 30 then set on automatic to modulate and maintain 100° C. The 100° C. air is then distributed by means of manifold 38 to pass through and over the surface of lumber on stickers in packages as normally assembled for air drying of lumber in the drying kilns 44.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a charcoal production facility including kiln means for transforming wood into charcoal, an apparatus for reclaiming heat produced during said transforming, said apparatus comprising:
   first duct means connected to said kiln means for removing wood gases produced during said transforming;
   afterburner means connected to said first duct means and including auxiliary fuel burner means for raising said wood gases to an incendiary temperature, said afterburner means emitting products of complete combustion, said after burner means including an exhaust stack;
   first damper means disposed proximate to said afterburner means for regulating the temperature of said products of complete combustion emitted from said afterburner means, said first damper means including a controlled exhaust damper disposed across said stack, said exhaust damper permitting a discharge of a selected portion of said products of complete combustion to the atmosphere while directing an undischarged portion to said second duct means;
   second duct means for distributing said products of complete combustion from said afterburner means to an end use station; and
   second damper means in fluid communication with said second duct means for allowing cooling air to mix with said products.

2. The invention defined in claim 1 and further including a fan means connected in said second duct means for forcing said products of complete combustion therethrough.

3. The invention of claim 1 wherein said end use station comprises a wood drying kiln.

4. The invention defined in claim 1 wherein said afterburner means includes a combustion chamber, said combustion chamber being cylindrical in shape, said auxiliary fuel burner means including at least one fuel burner unit mounted with its centerline disposed at an angle to a diameter of said combustion chamber which intersects said centerline at the point of connection of the fuel burner unit to the combustion chamber.

5. The invention defined in claim 4 and further wherein said auxiliary fuel burner means includes a second fuel burner unit mounted to said cylindrical combustion chamber at a position radially opposed from said at least one fuel burner unit at an angle similar to that of said at least one fuel burner unit.

6. The invention defined in claim 5 and further wherein said combustion chamber includes a plurality of adjustable air holes spaced circumferentially of said combustion chamber.

7. The invention defined in claim 6 and further including a thermocouple mounted above said combustion chamber for monitoring the temperature in said chamber, control means responsive to said thermocouple for modulating said fuel burner units to maintain said combustion chamber at a predetermined temperature.

8. The invention defined in claim 1 and further including gate means disposed in said first duct means for selectively disconnecting said kiln means from said afterburner means.

9. In a charcoal production facility, an apparatus for reclaiming heat produced during a wood to charcoal transformation process, said apparatus comprising in combination:
   kiln means operable to change said wood to said charcoal;
   manifold means for collecting heated gases emitted from said kiln means during said transformation process, said manifold means including at least one conduit in fluid connection with said kiln means so as to permit a flow of said heated gases into said manifold means;
   gate means operably positioned within said at least one conduit to selectively control said flow of said heated gases from said kiln means into said manifold means;

afterburner means in fluid connection with said manifold means, said afterburner means including a combustion chamber into which said heated gases may be directed and further including auxiliary fuel and air supply means whereby said heated gases may be subjected to a combustion process;

exhaust means operably attached to said afterburner means, said exhaust means serving to receive said flow of said heated gases after said combustion process, said exhaust means including a stack means and an end use conduit means;

first control means positioned within said exhaust means, said first control means including a temperature responsive damper which selectively directs said flow of said heated gases through said stack means and through said end use conduit means;

second control means positioned within said end use conduit means, said second control means including a temperature responsive damper which selectively admits a supply of cool outside air to said flow of said heated gases thereby to effectively control the temperature of said heated gases;

transfer means positioned within said end use conduit means, said transfer means including a fan for facilitating said flow of said heated gases through said end use conduit means;

end use means for receiving said flow of said heated gases, said end use means including a structure into which a material may be positioned for drying; and third control means positioned within said end use conduit means and lying proximate to said end use means, said third control means including at least one damper operable to limit said flow of said heated gases into said end use means.

10. An afterburner for use in a heat recovery facility, said afterburner including in combination:

a receiving plenum into which a flow of heated gases may be directed through a conduit means;

a combustion chamber mounted on a topmost portion of said receiving plenum, said combustion chamber being of a substantially cylindrical design and having an interior portion thereof lined with a refractory material to facilitate heat retention during a combustion process therein;

auxiliary fuel supply means, said auxiliary fuel supply means including at least one fuel inlet nozzle, said at least one fuel inlet nozzle serving to direct a spray of fuel at an angle oblique to a longitudinal axis of said combustion chamber;

auxiliary air supply means, said auxiliary air supply means including at least one adjustable air inlet located on a bottommost portion of said combustion chamber and positioned between a topmost portion of said receiving plenum and said auxiliary fuel supply means;

stack means operably positioned on a topmost portion of said combustion chamber, said stack means serving to discharge products of said combustion process into a surrounding atmosphere;

auxiliary conduit means fluidly connected to said stack means and orthogonally aligned therewith, said auxiliary conduit means serving to receive said products of said combustion process to direct the same to a desired location;

damper means positioned within said stack means at a location whereby said auxiliary conduit means is positioned between said damper means and said combustion chamber so as to permit a selective control of flow of said products of said combustion process through said stack means and said auxiliary conduit means; and thermocouple means operably positioned within said stack means, said thermocouple means serving to control the positioning of said damper means whereby a desired amount of said products of said combustion process may be directed upwardly through said stack means and out into said atmosphere as a function of temperature within said stack means.

* * * * *